US 6,615,707 B1

(12) United States Patent
Zittel et al.

(10) Patent No.: US 6,615,707 B1
(45) Date of Patent: Sep. 9, 2003

(54) FRAMELESS BLANCHER FOR FOOD

(75) Inventors: David R. Zittel, Columbus, WI (US); Daniel D. Maupin, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

(21) Appl. No.: 09/705,017

(22) Filed: Nov. 2, 2000

(51) Int. Cl.[7] ................................................ A47J 36/06
(52) U.S. Cl. ........................ 99/348; 99/404; 99/443 R; 99/467; 99/483; 99/516
(58) Field of Search .......................... 99/348, 403, 404, 99/467, 483, 516, 478, 443 R

(56) References Cited

U.S. PATENT DOCUMENTS

| | | | | |
|---|---|---|---|---|
| 3,760,714 A | * | 9/1973 | Lortz | 99/404 |
| 3,812,775 A | * | 5/1974 | Sijbring | 99/404 |
| 4,942,810 A | | 7/1990 | Zittel et al. | 99/477 |
| 5,133,249 A | | 7/1992 | Zittel | 99/348 |
| 5,429,041 A | | 7/1995 | Zittel | 99/348 |
| 5,592,869 A | | 1/1997 | Zittel | 99/348 |
| 6,012,381 A | * | 1/2000 | Hawn | 99/340 |
| 6,263,785 B1 | * | 7/2001 | Zittel | 99/348 |

* cited by examiner

*Primary Examiner*—Drew Becker
(74) *Attorney, Agent, or Firm*—Boyle Fredrickson Newholm Stein & Gratz S.C.

(57) ABSTRACT

A frameless food blancher has a steel tank of generally U-shaped, transverse cross sectional shape and also has an open top with opposite sides. The opposite sides each have an upper edge bent inwardly and downwardly to form an upwardly facing water trough. A rigidifying steel member co-extensive in length with the trough is welded to it, and is also welded to the outer side of the tank. The trough and member form a cross section shape of triangular-box-cross-section and act to rigidify the sides. The blancher has opposite ends and an end plate is fabricated from sheet steel and has a main portion welded to each of the opposite ends of the tank. These plates also each having a leg portion integral with the main portion for supporting the blancher. The end plates are formed by being cut by a CNC laser machine which simultaneously forms a series of holes extending through the end plate. A method of manufacturing the steel end plate for a food blancher, the end plate has a main portion for being welded to a tank end and an integral leg portion extending from the main portion. The method is accomplished by providing a steel sheet and automatically cutting out the main portion and the integral leg portion, and also substantially simultaneously locating and cutting holes in the end portion, all cutting being done automatically by a CNC laser machine

10 Claims, 5 Drawing Sheets

FRAMELESS BLANCHER FOR FOOD

FIELD OF THE INVENTION

This invention relates to apparatus for processing food in general and in particular to apparatus for heating food products within a water bath.

BACKGROUND OF THE INVENTION

In the apparatus of the type to which the present invention pertains, it is necessary to produce a blancher at a minimum cost and of simplified design.

Prior art blanchers utilize a separate frame for supporting the tank of the blancher which may include a framework welded together and including legs in the frame for supporting the main portion of the blancher. Such blanchers are shown in U.S. Pat. No. 5,429,041, issued Jul. 4, 1995 to Zittel; U.S. Pat. No. 5,592,869, issued Jan. 14, 1997 to Zittel; U.S. Pat. No. 5,133,249, issued Jul. 28, 1992 to Zittel; and U.S. Pat. No. 4,942,810, issued Jul. 24, 1990 to Zittel and Robbins et al.

The prior art including the above patents utilize a separate framework which is welded together and then the tank itself is assembled into this framework. This separate frame construction results in considerable cost.

The prior art constructions also required many feet of welding to provide a water seal between the cover of the blancher and the lower tank portion thereof.

SUMMARY OF THE INVENTION

The blancher of the present invention provides a frameless design and a simplified water seal between the cover and the lower tank. The lack of a separate frame structure is possible by the use of end plates for the tank, which have integrally formed legs. These end plates for the tank can be cut on a CNC (Computer Numerical Control) laser machine which locates all of the holes in the end plate precisely and which permits subsequent robotic welding of attached tubes, as will appear. These end plates are welded to each end of the lower tank portion. The end plates with the integral legs are fabricated to form the particularly rigid and strong structure.

Another object of the invention is to provide a simplified cover for the tank and together therewith forms a simplified water seal between the cover and the tank which eliminates many feet of welding in such a structure.

The invention also provides a particularly rigid structure which includes the U-shape tank having an end plate with integral legs welded to each end of the tank and also having a pair of main tubes extending between the two end plates and rigidly secured thereto as by welding. The upper opposite edges of the tank are formed in a particularly rigid manner by means of being fabricated to form a water seal for the cover. These two rigid upper edges of the tank, together with the two main tubes and the end plates with integral legs, all form a particularly rigid and economically produced structure. In addition, they permit easy assembly, handling, strength, and the ability to accommodate thermal stresses.

The present invention also provides a method of manufacturing a steel end plate for a food blancher. The CNC laser machine is used with the present manufacturing process and is of itself a conventional but improved design. This machine is engineered to maximize beam intensity and provides a constant length pivoting beam, which minimizes beam divergence. Vibration has been reduced using computer-aided engineering. These machines are of the $CO_2$ gas laser type having a wavelength of 10.6 micron non-visible light. If other characteristics of this laser machine are deemed to be either necessary or desirable, reference may be had to the Mazak Nissho Iwai Company located in Schaumburg, Ill. 60173.

These and other objects and advantages of the present invention will appear hereinafter as this disclosure progresses.

DESCRIPTION OF A PREFERRED EMBODIMENT

Figure 1:
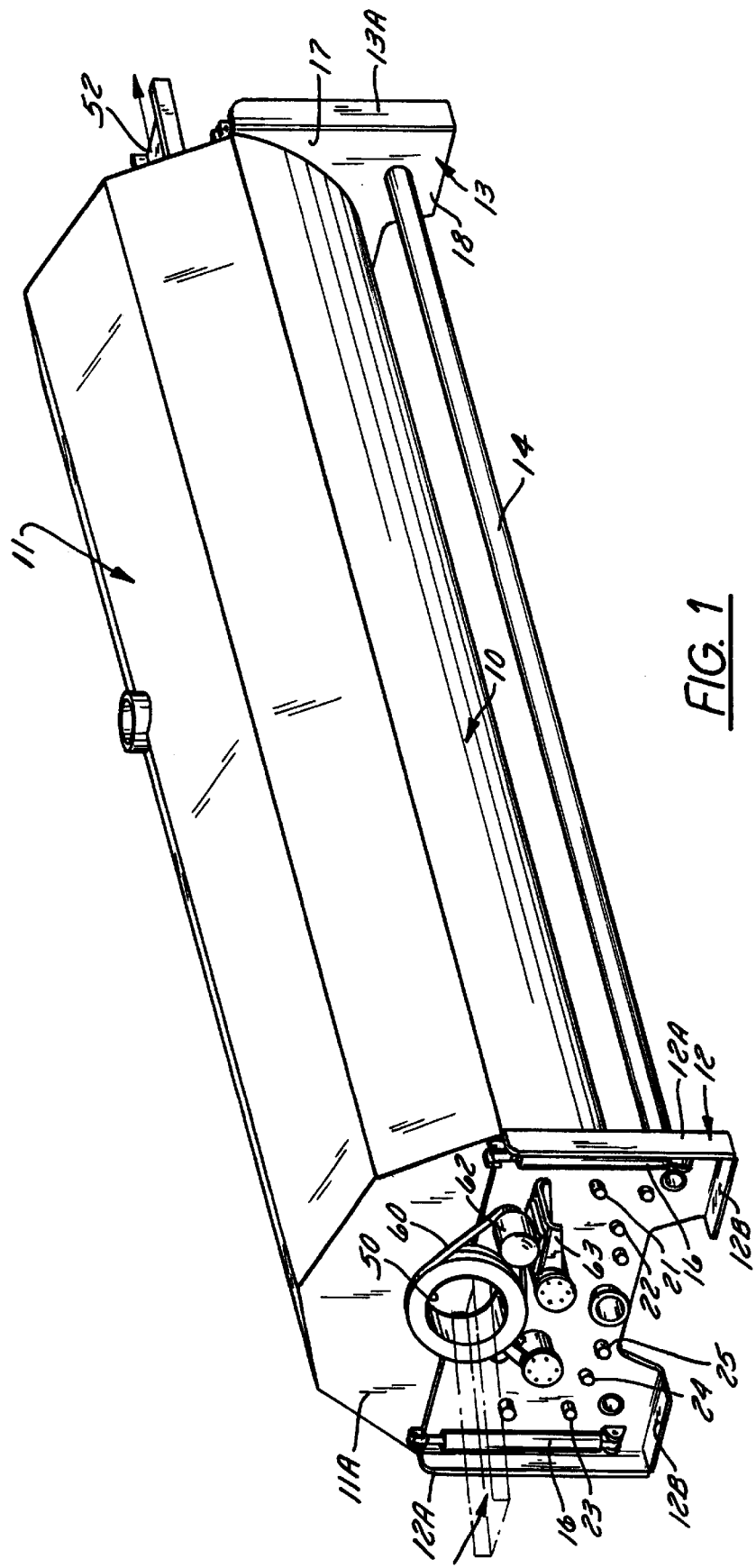
FIG. 1 is a general perspective view of the frameless blancher of the present invention and shown in the assembled position.
Figure 2:
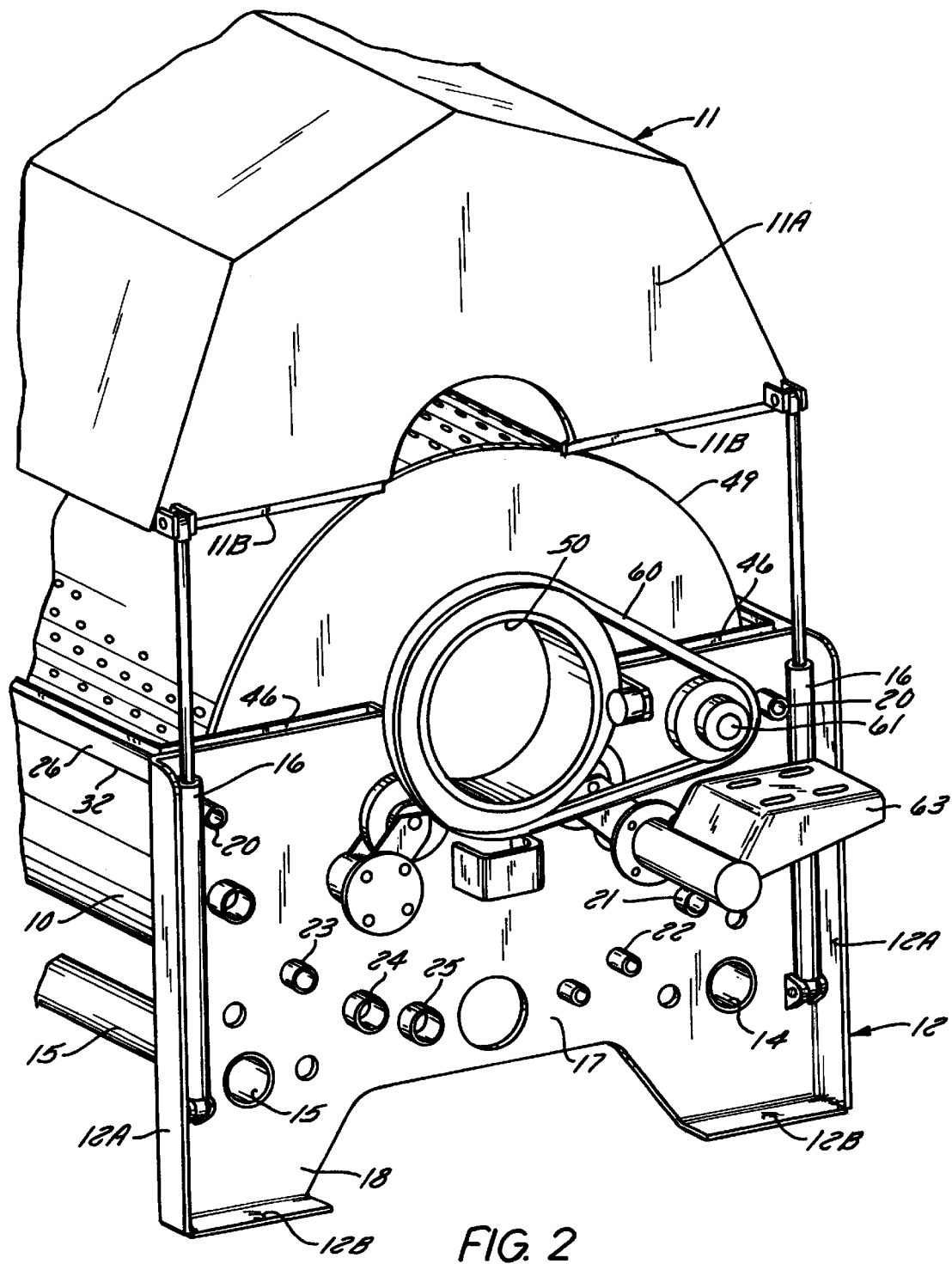
FIG. 2 is an enlarged, fragmentary view of the front end portion of the blancher shown in FIG. 1 but also showing the cover in the raised position.

Referring to FIG. 1, the general organization of the improved blancher includes the generally U-shaped in cross-section tank 10, the cover 11 extending co-extensively with the tank 10, two end plates 12 and 13 with integral legs. As shown in FIG. 2, the cover 11 can be raised and thus separated from the tank by means of the hydraulic or electric cylinders 16 located at each corner of the blancher and connected between the end plates 12 and 13.

Plates 12 and 13 are similarly formed and have a main portion 17 (FIG. 3) and a lower leg portion 18.

The end plates 12 and 13 with integral legs are fabricated from heavy sheet steel of a thickness, for example, ⅜of an inch.

As shown clearly in FIG. 2, the end plates 12 and 13 have a series of precisely located holes formed therein by being cut on a CNC laser machine simultaneously with the cutting of the end plate itself. These end plates are the main structural support for the blancher and result in considerable material saving and labor due to the lack of framework material being otherwise required as in conventional blanchers. The holes in the end plate include those previously mentioned for the two tubes 14 and 15, welded therein. The tubes 14 and 15 are also utilized by acting as conduits or enclosures for running air or hydraulic lines, etc., or other utility members.

As an example of the use of the other holes, hole 20 is for water discharge (as will appear), hole 21 is for steam, hole 22 is for a thermometer, hole 23 is for steam, holes 24 and 25 are for air discharge, with all of these holes being accurately and efficiently formed by a laser controlled numerical cutting device.

Figure 3:
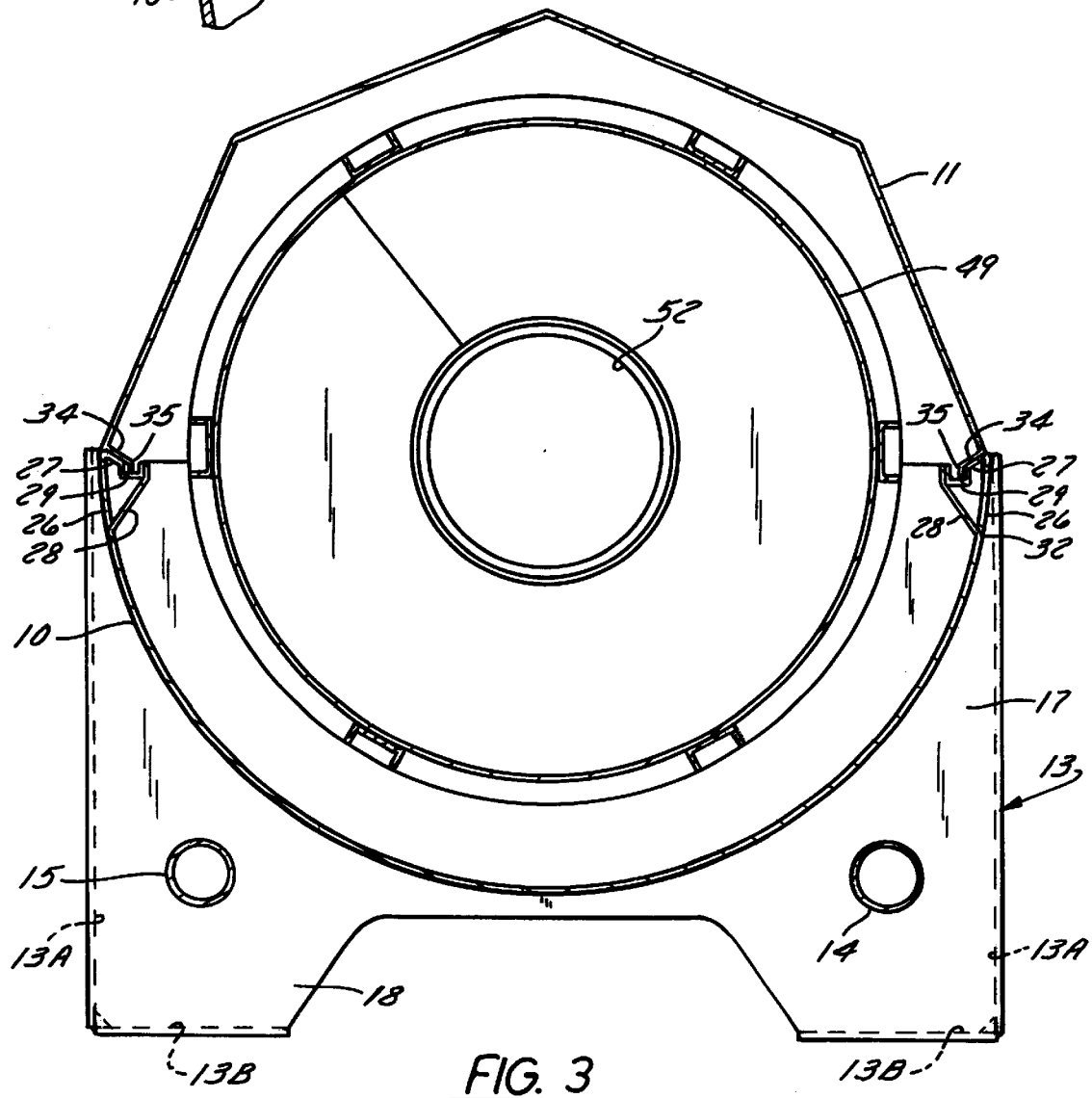
FIG. 3 is a transverse sectional view through the blancher and on a slightly enlarged scale.

It will be noted that the end plates have outwardly turned flanges along their opposite vertical edge. The lower portion of the end plates 12 and 13 has, respectively, outwardly turned flanges 12A and 13A along the vertical sides. Flanges 12B and 13B are formed along the lower edges of plates 12 and 13, respectively. The flanges 12A and 12B are welded together at their corner intersection as shown in FIG. 3 and the end plate 13 at the opposite end of the blancher is similarly formed, resulting in end plates that are particularly strong and rigid.

Along the length of the upper edges of the tank, as shown clearly in FIGS. 3, 4, 6 and 8, are formed water seals between the cover 11 and the tank 10. More particularly, as shown clearly in FIG. 8, the upper edge of the tank 10 has an inwardly turned portion 28 that terminates in an upper end 28a. A steel rigidifying member 26 extends along the upper edge of the length of each side of the tank. Member 26 is bent inwardly as at 27 and terminates in an upwardly facing trough 29 of which terminates in an upper free end 30. The lower edge 31 of member 26 is welded at 32 along the length of the outside of the tank. The upper end of member 28a is welded all along at 33 to the free end 30 of the trough 29.

This design requires only two lengths of welding on each side of the tank and is relatively easy to make because the joints are easily accessible.

The upper corner of the tank is thus formed as a generally triangular in cross section box B, is particularly rigid and resists twisting and bending of the tank. This construction also maintains the shape and straightness of the assembly during construction. Also, the trough is concealed within the blancher and shielded from contact by the operator.

This simplified water seal also results in a simplified cover design which is relatively light and inexpensive to manufacture.

Thus, along each upper edge of the tank a rigidifying structure is provided, which together with the tubes 14 and 15, the tank 10, end plates 12 and 13, forming the integral legs, create a strong and rigid structure without the necessity for additional framework.

Figure 4:
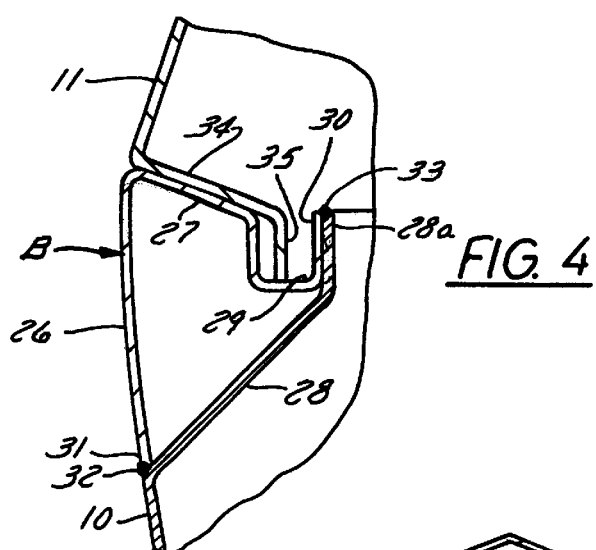
FIG. 4 is an enlarged, fragmentary view of the water seal between the cover and the tank, the view being an enlargement of the corresponding portion shown in FIG. 3.

As shown in FIGS. 3 and 4, to form the water seal along the entire length of the upper edges of the tank, the cover 11 has an inwardly turned portion 34 along its length, at each side. This portion 34 terminates in a downwardly turned portion 35 that is located in the trough or channel 29 of the tank as shown in FIG. 4. Thus, the moisture water flows down the inner side of the cover 11 and into the trough 29 where it is drained out of the tank for example, through the end plate holes 20 (FIGS. 2 and 5).

A water seal is also formed between the end plates 12 and 13 of the tank and ends 11A of the cover 11 (FIG. 2). A flange 11B is formed by bending along the lower, inside edge of each end 11A of the cover and its lower edge is received in the trough 46 (FIGS. 2 and 5) that is welded along the inner side of the end plates 12 and 13. The end troughs 46 are in communication with the side troughs 29 at their corner points of juncture and are both then drained out of the previously mentioned holes 20.

Within the tank is located the conventional rotary apparatus 49 for moving the product from the inlet end 50 (FIG. 2) to the outlet end 52 (FIG. 3) in the known manner. This rotary food transporting apparatus is shown in the above mentioned patents and others, and which patents are incorporated here by reference. A further description of such food transporting apparatuses is deemed neither desirable nor necessary in the present application.

Figure 5:
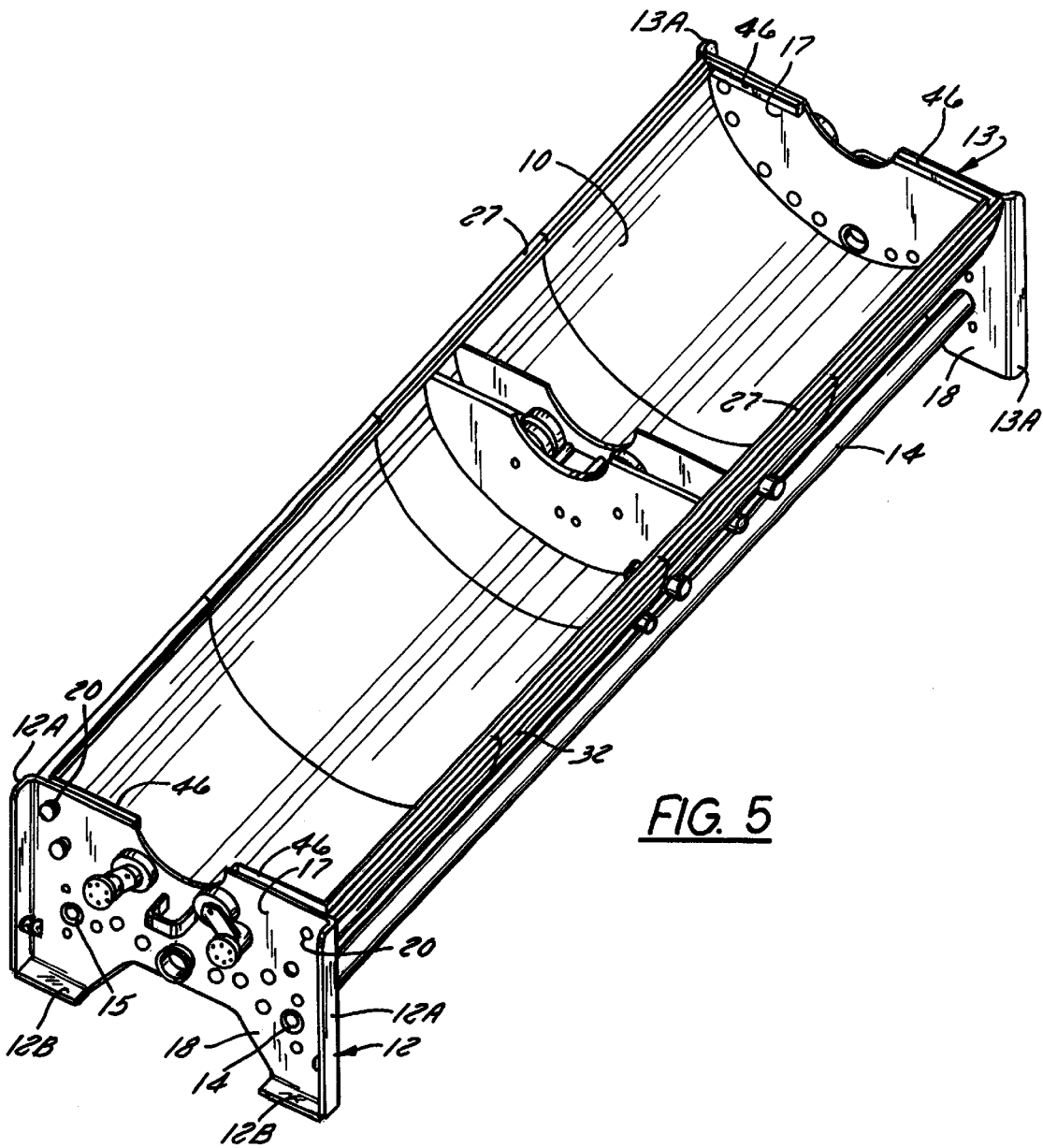
FIG. 5 is a perspective, view of the tank with the end plates welded thereto and also showing the rotary support drums located generally centrally of the length of the tank.
Figure 7:
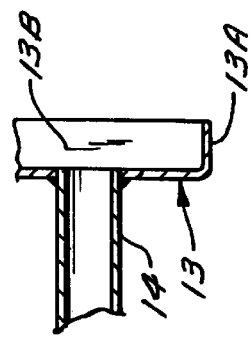
FIG. 7 is a fragmentary cross-sectional view through the end plate and a main tube welded thereto.
Figure 7:
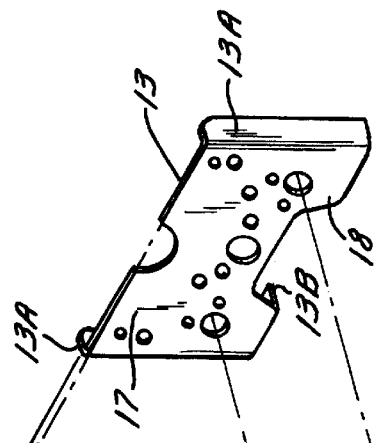

As shown in FIG. 5 conventional means are provided for supporting rotary drums of the food transporting apparatus as shown and described in U.S. Pat. No. 5,429,041 (FIG. 11). These two separate rotary drums are driven at each end of the blancher by a pulley 60 (FIGS. 1 and 2) which, in turn, is driven by the shaft 61 from the electric motor 62 (mounted on the platform 63) in the known manner. This driving arrangement is the same at each end of the blancher.

Recapitulation

Figure 6:
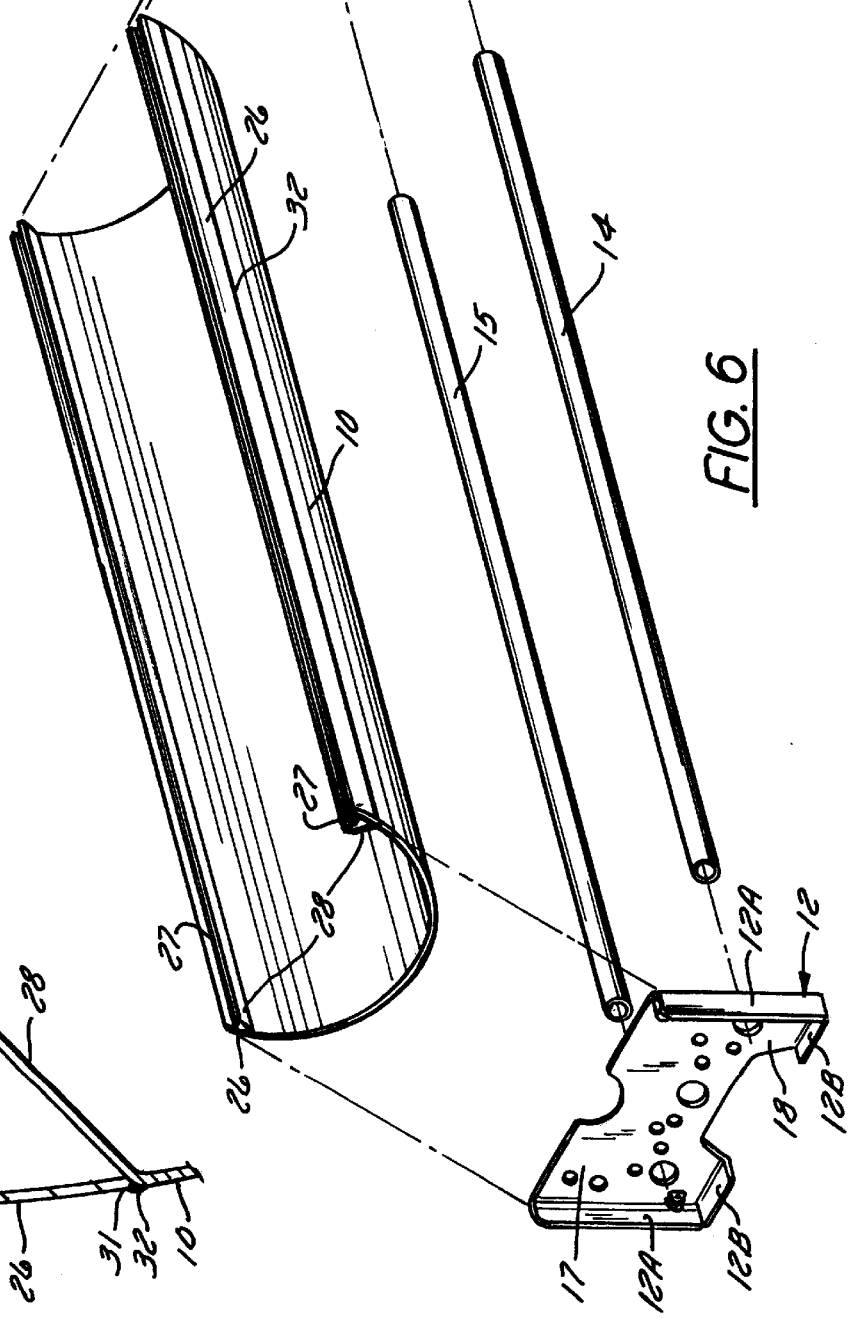
FIG. 6 is a perspective, exploded view of the tank, the end plates with integral legs, and two main tubes extending between the end plates and welded thereto.
Figure 8:
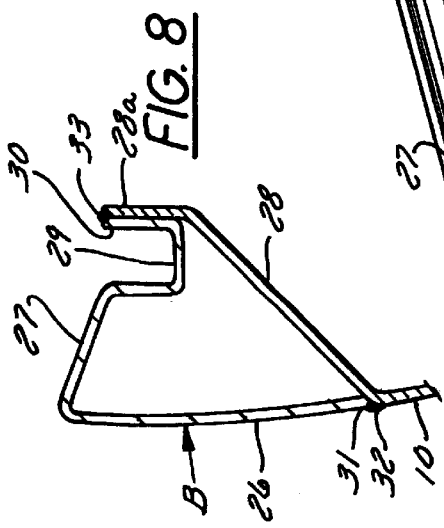
FIG. 8 is an enlarged detail of the rigid upper edge of the tank, which is formed along each upper edge of the tank and which, together with the main tubes, the tank, and the end plates with integral legs, form a particularly rigid structure.

As shown in FIG. 6, the present invention provides a particularly rigid basic structure for a food blancher and which includes the tank 10 having a rigidifying upper edge along either of its sides, formed by the water seal, the two end plates 12 and 13 with integral legs, the end plates being formed simultaneously with the necessary openings by means of CNC laser operation. The basic tank is furthermore rigidified and strengthened by the two elongated tubes 14 and 15 welded at each of their ends to the end plates. These tubes take significant stress off the tank.

The end plate of the tank can be cut on a CNC laser machine which also locates all of the holes precisely and which permits robotic welding of parts to be subsequently attached. This structure provides a material saving due to the lack of a frame material. This frameless design also provides the simplified water seal along each side of the machine between the tank and cover and which results in a cover design which is lighter and less expensive than prior art devices. The end plates are provided with integrally formed legs and the entire arrangement permits the elimination of a separate frame structure.

What is claimed is:

1. A frameless food blancher comprising, a steel tank of generally elongated and U-shaped, transverse cross-sectional shape and having an open top with opposite sides, said opposite sides each having an upper edge bent inwardly along the length of said tank to support a welded water trough disposed inwardly of and spaced from an outer wall of said tank, wherein said upper edge, said outer wall, and said trough form a generally triangular in cross-section closed box section along the entire length of each of said opposite sides.

2. The blancher described in claim 1 further characterized by having opposite ends, an end plate fabricated from sheet steel and having a main portion welded to each of said opposite ends of said tank, said plates also each having a leg portion formed integrally with said main portion for supporting said blancher.

3. The blancher set forth in claim 2 wherein said end plate has a series of precisely located holes extending therethrough, which holes are located and cut precisely by a CNC laser cutting operation.

4. The blancher of claim 3 including a flange formed by bending along each of said main portions and their respective leg portion extending therefrom, said flange being bent at a substantial right angle to said main portion and said leg portion to rigidify said end plate.

5. The blancher set forth in claim 2 including a pair of unperforated tubes welded to and extending between said opposite end plates to rigidify said blancher.

6. A frameless food blancher comprising, a steel tank of generally U-shaped, transverse cross-sectional shape and having an open top with opposite sides, said opposite tank sides each having an upper portion bent inwardly and upwardly along said sides and terminating in an edge, and a rigidifying steel member co-extensive in length with said tank and having a lower edge welded to the outside of said tank, said rigidifying steel member extending inwardly and forming an upwardly facing water trough therealong, said trough being disposed inwardly of and spaced from an outer wall of said tank, said rigidifying steel member welded to said edge of said upper portion of said tank side thereby forming a generally triangular in cross-section closed box for rigidifying said tank sides.

7. A frameless food blancher comprising, a steel tank of generally U-shaped, transverse cross-sectional shape and having an open top with opposite sides, said opposite tank sides each having an upper portion bent inwardly and upwardly and terminating in an upper edge, and a rigidifying steel member co-extensive in length with said tank and having a lower edge welded to the outside of said tank, said steel member extending inwardly and forming a trough therealong, said trough being disposed inwardly of and spaced from an outer wall of said tank, said steel member welded to said upper edge of said upper portion of said tank side thereby forming a generally triangular in-cross-section box for rigidifying said sides, said tank having opposite ends, a pair of end plates fabricated from sheet steel and having a main portion welded to each of said opposite ends of said tank, said end plates also each having a leg portion formed integrally with said main portion for supporting said blancher, said end plates having opposite vertical edges, including a flange formed by bending along each of said opposite vertical edges of said end plate main portions and their respective leg portion extending therefrom, said flange being bent at a substantial right angle to said main portion and said leg portions to rigidify said end plate, and a pair of nonperforated tubes welded to and extending through and between said opposite end plates to rigidify said blancher.

8. A frameless food blancher comprising:
   a tank of generally elongated and U-shaped, transverse cross-sectional shape and having an open top with opposite sides defining corresponding upper edges;
   a trough disposed inwardly of and spaced from an outer wall of said tank;
   wherein at least one of said opposite sides of said tank has an upper edge bent inwardly along the length of said upper edge to provide support, said upper edge being welded to said trough; and
   wherein said upper edge, said outer wall and said trough substantially form a closed box section that has a generally triangular cross-section along the entire length of said opposite side.

9. A frameless food blancher comprising:
   a tank of generally U-shaped, transverse cross-sectional shape and having an open top with opposite sides, at least one of said opposite tank sides having an upper portion bent inwardly and upwardly along said side and terminating in an edge;
   an upwardly facing trough disposed inwardly of and spaced from an outer wall of said tank; and
   wherein said tank includes a rigidifying member having a lower edge welded to the upper portion, said rigidifying member extending inwardly and forming said upwardly facing trough therealong, said rigidifying member welded to said edge of said upper portion of said tank side thereby forming a closed box having a generally triangular cross-section.

10. A frameless food blancher comprising:
    a tank of generally U-shaped, transverse cross-sectional shape and having an open top with opposite sides, at least one of said opposite sides having an upper portion bent inwardly and upwardly and terminating in an edge, said tank having opposite ends, a pair of end plates having a main portion welded to corresponding ones of said opposite ends of said tank and a leg portion formed integrally with said main portion for supporting said blancher, said end plates having opposite vertical edges, including a flange formed by bending along each of said opposite vertical edges of said end plate main portions and their respective leg portion extending therefrom, said flange being bent at a substantial right angle to said main portion and said leg portions;
    a pair of nonperforated tubes welded to and extending through and between said opposite end plates;
    a trough disposed inwardly of and spaced from an outer wall of said tank; and
    wherein said tank includes a rigidifying member having a lower edge welded to the upper portion, said rigidifying member extending inwardly and forming said trough therealong, said rigidifying member welded to said edge of said upper portion of said tank side thereby forming a box that is generally triangular in-cross-section.

\* \* \* \* \*

UNITED STATES PATENT AND TRADEMARK OFFICE
CERTIFICATE OF CORRECTION

PATENT NO.   : 6,615,707 B1
DATED        : September 9, 2003
INVENTOR(S)  : David R. Zittel and Daniel D. Maupin It is certified that error appears in the above-identified patent and that said Letters Patent is hereby corrected as shown below:

Title page,
Item [*] Notice, should read
-- Subject to any disclaimer, the term of this patent is extended or adjusted under 35 U.S.C. 154(b) by 56 days. --

Signed and Sealed this

Twenty-second Day of March, 2005

JON W. DUDAS
*Director of the United States Patent and Trademark Office*